Oct. 16, 1923.

S. J. HEATH 1,471,261

COUNTER MOLDING MACHINE

Filed Dec. 5, 1921

WITNESSES
Frederick Diehl.
A. L. Kitchin.

INVENTOR
SIDNEY J. HEATH
BY
ATTORNEYS

Oct. 16, 1923.

S. J. HEATH 1,471,261

COUNTER MOLDING MACHINE

Filed Dec. 5, 1921 15 Sheets-Sheet 2

Fig.2.

WITNESSES
Frederick Diehl.
A. L. Kitchin.

INVENTOR
SIDNEY J. HEATH
BY Munn & Co.
ATTORNEYS

Oct. 16, 1923.

S. J. HEATH 1,471,261

COUNTER MOLDING MACHINE

Filed Dec. 5, 1921 15 Sheets-Sheet 3

WITNESSES
Frederick Diehl
A. L. Kitchin

INVENTOR
SIDNEY J. HEATH
BY
ATTORNEYS

Oct. 16, 1923.

S. J. HEATH 1,471,261

COUNTER MOLDING MACHINE

Filed Dec. 5, 1921    15 Sheets-Sheet 4

WITNESSES
Frederick Diehl.
A. L. Kitchin.

INVENTOR
SIDNEY J. HEATH
BY
ATTORNEYS

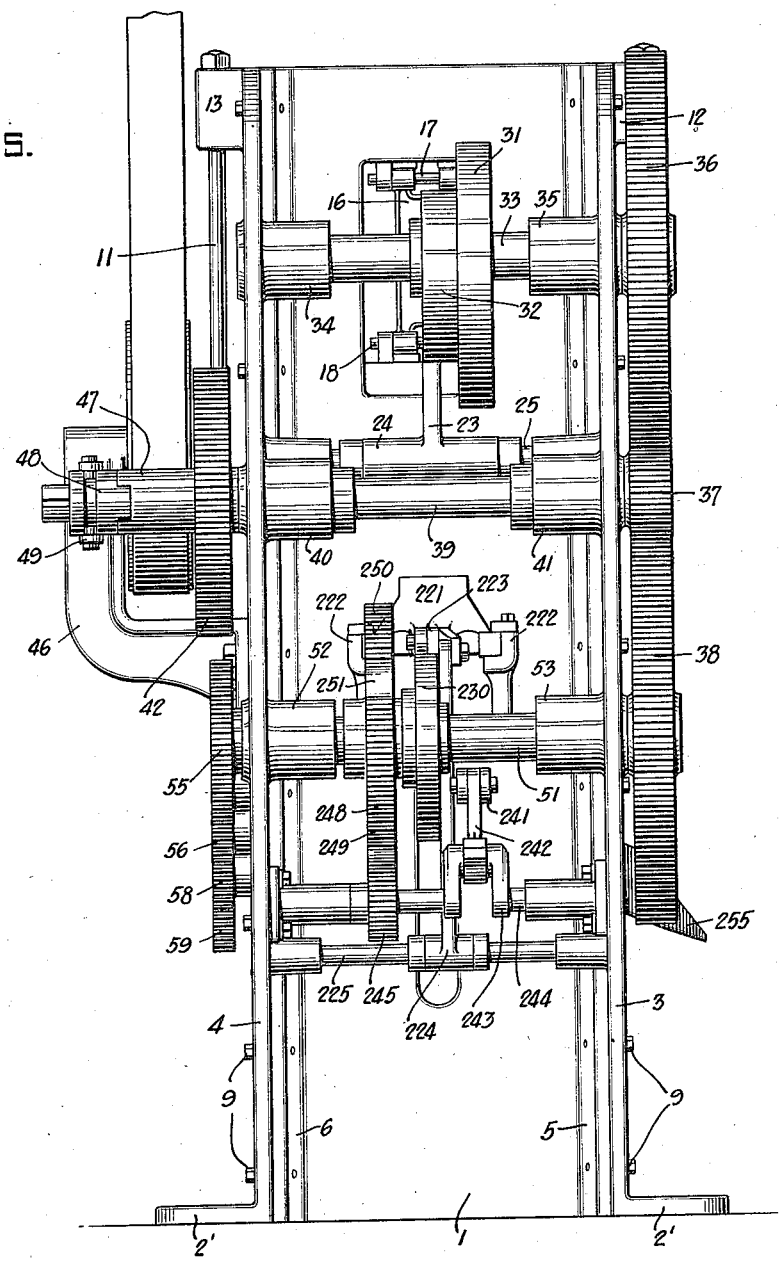

Oct. 16, 1923.
S. J. HEATH
1,471,261
COUNTER MOLDING MACHINE
Filed Dec. 5, 1921
15 Sheets-Sheet 6
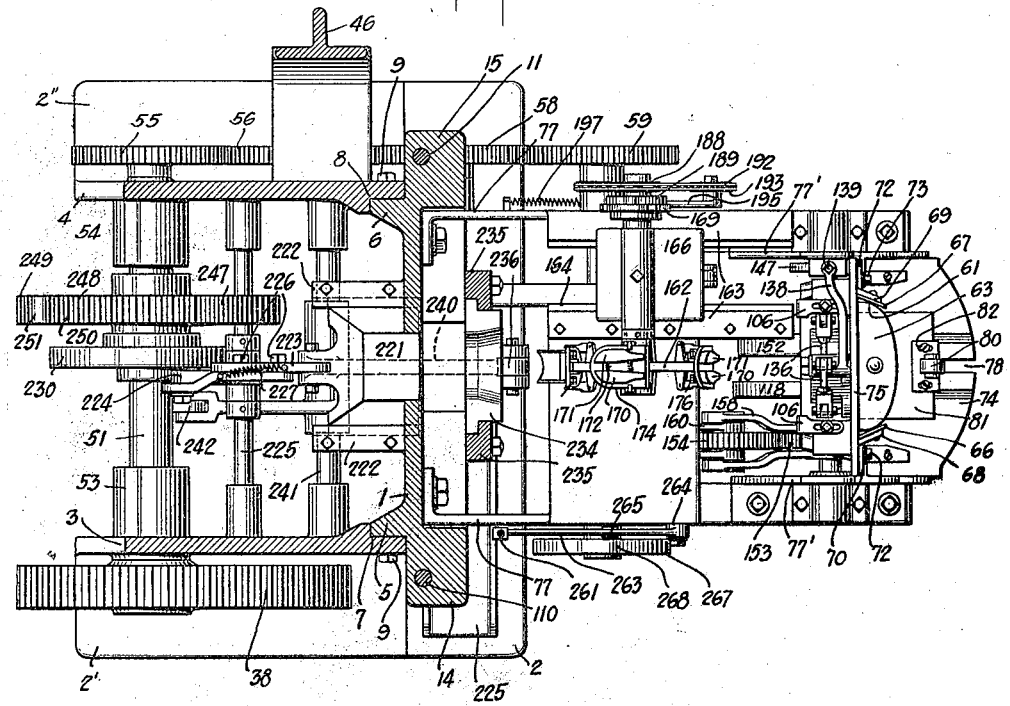
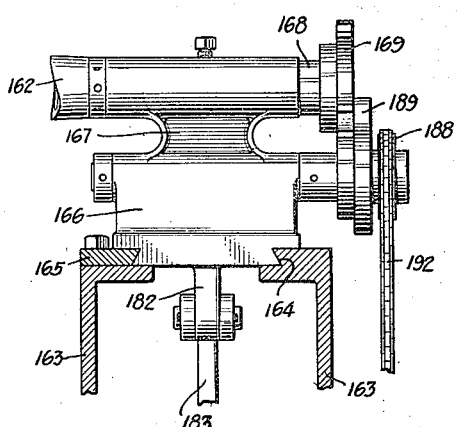
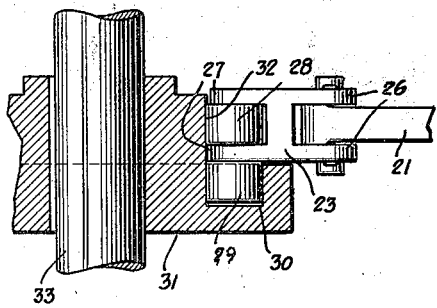
WITNESSES
Frederick Diehl.
A. L. Kitchin.
INVENTOR
SIDNEY J. HEATH
BY
ATTORNEYS

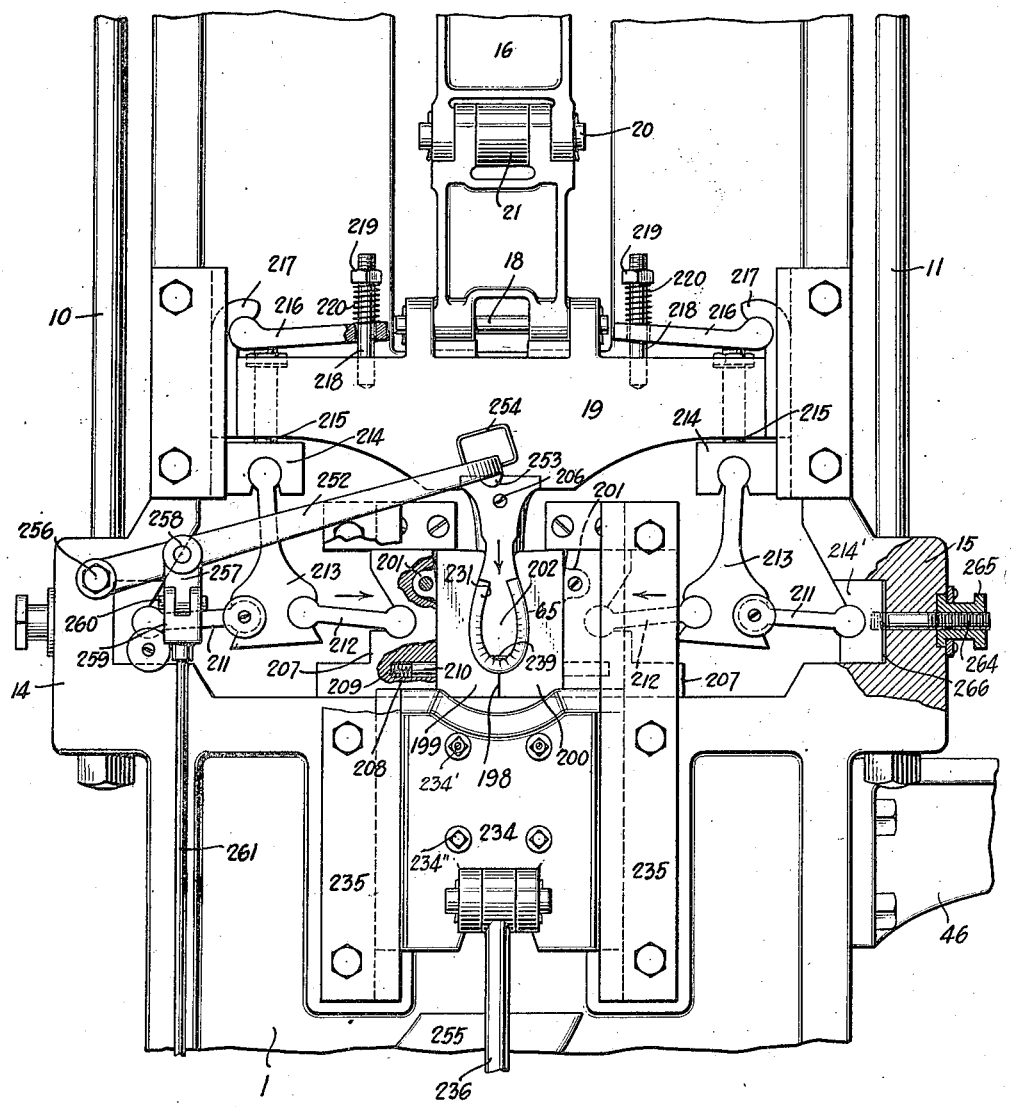

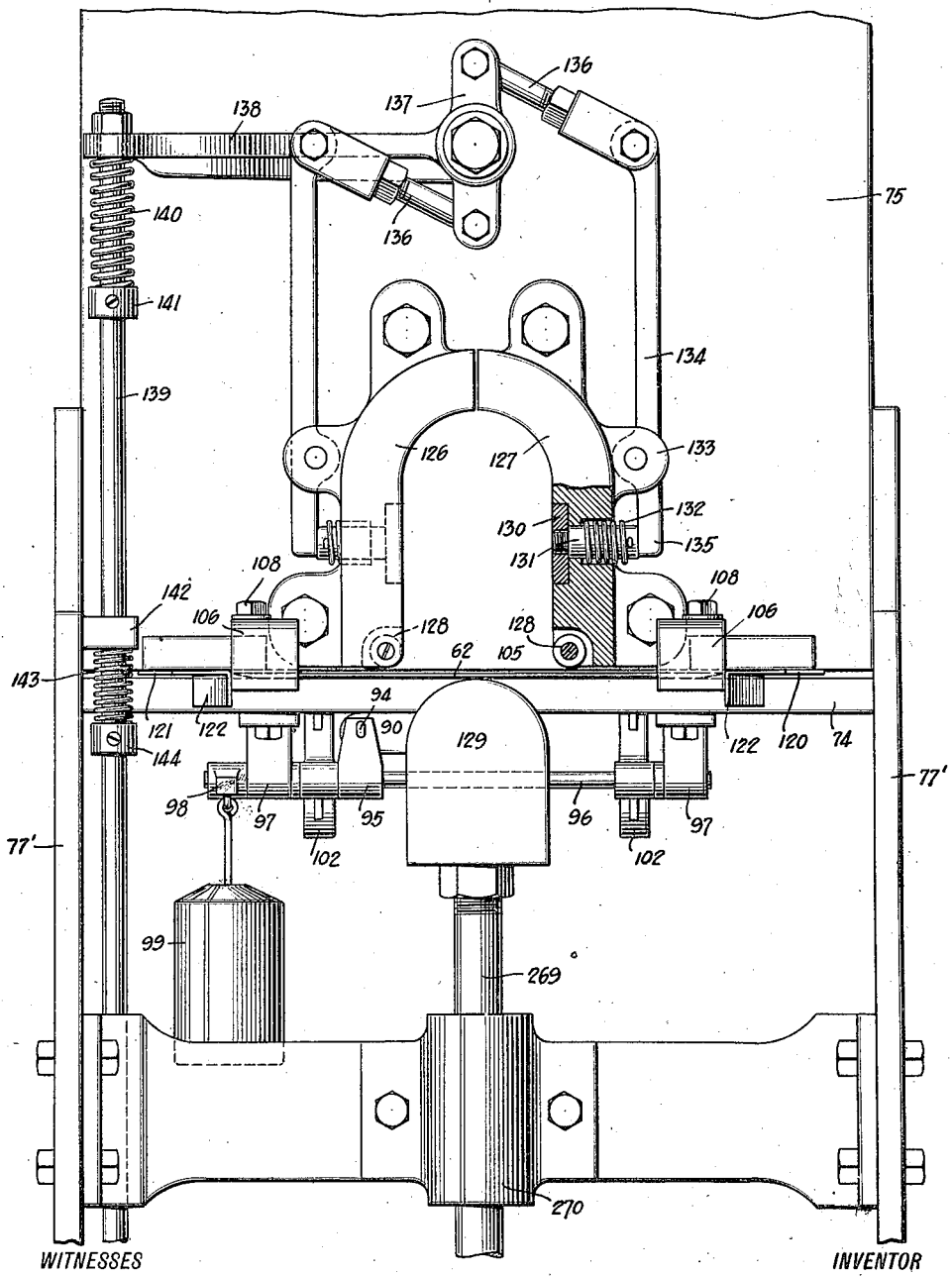

Oct. 16, 1923.  
S. J. HEATH  
COUNTER MOLDING MACHINE  
Filed Dec. 5, 1921  
1,471,261  
15 Sheets-Sheet 9
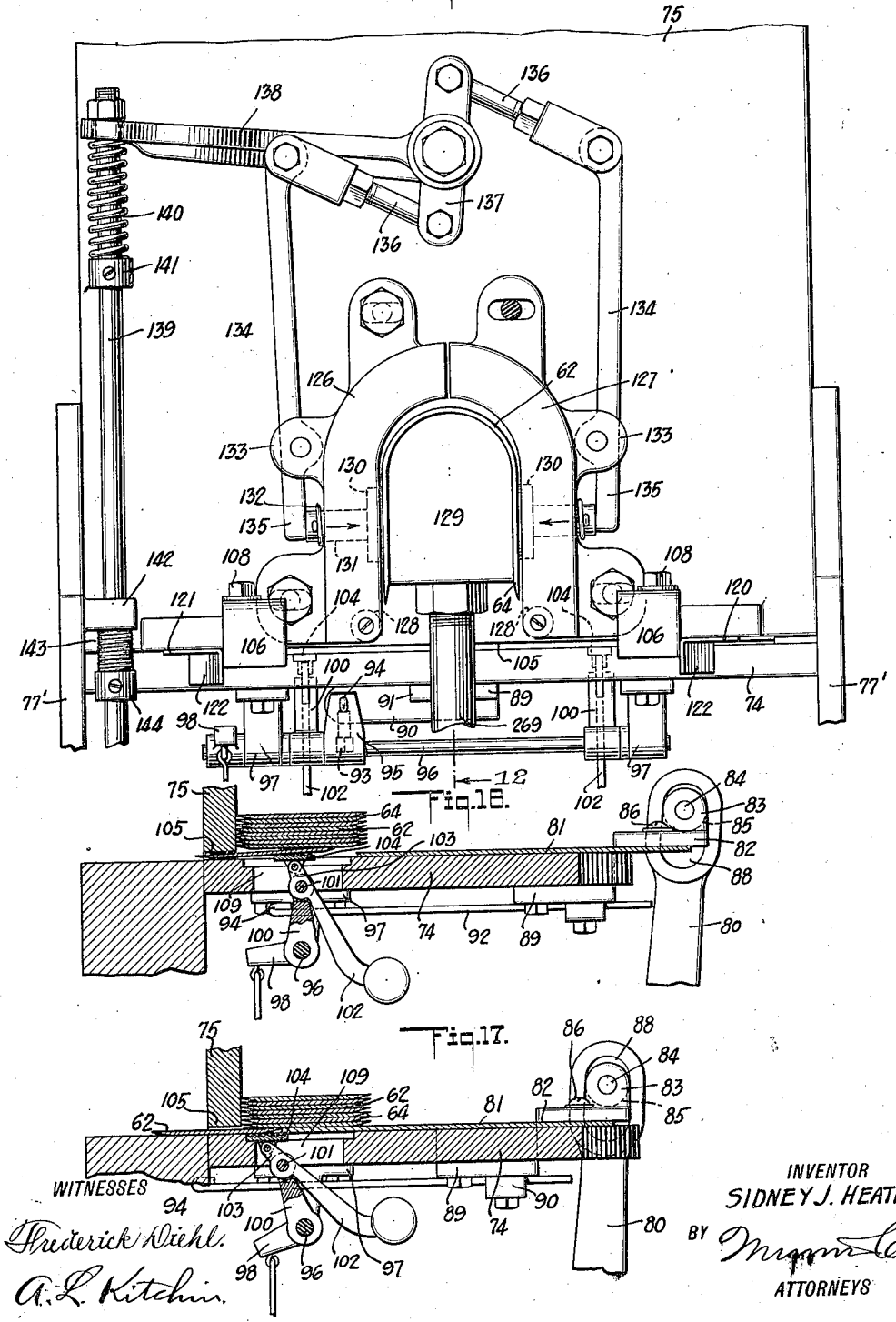
INVENTOR  
SIDNEY J. HEATH  
ATTORNEYS

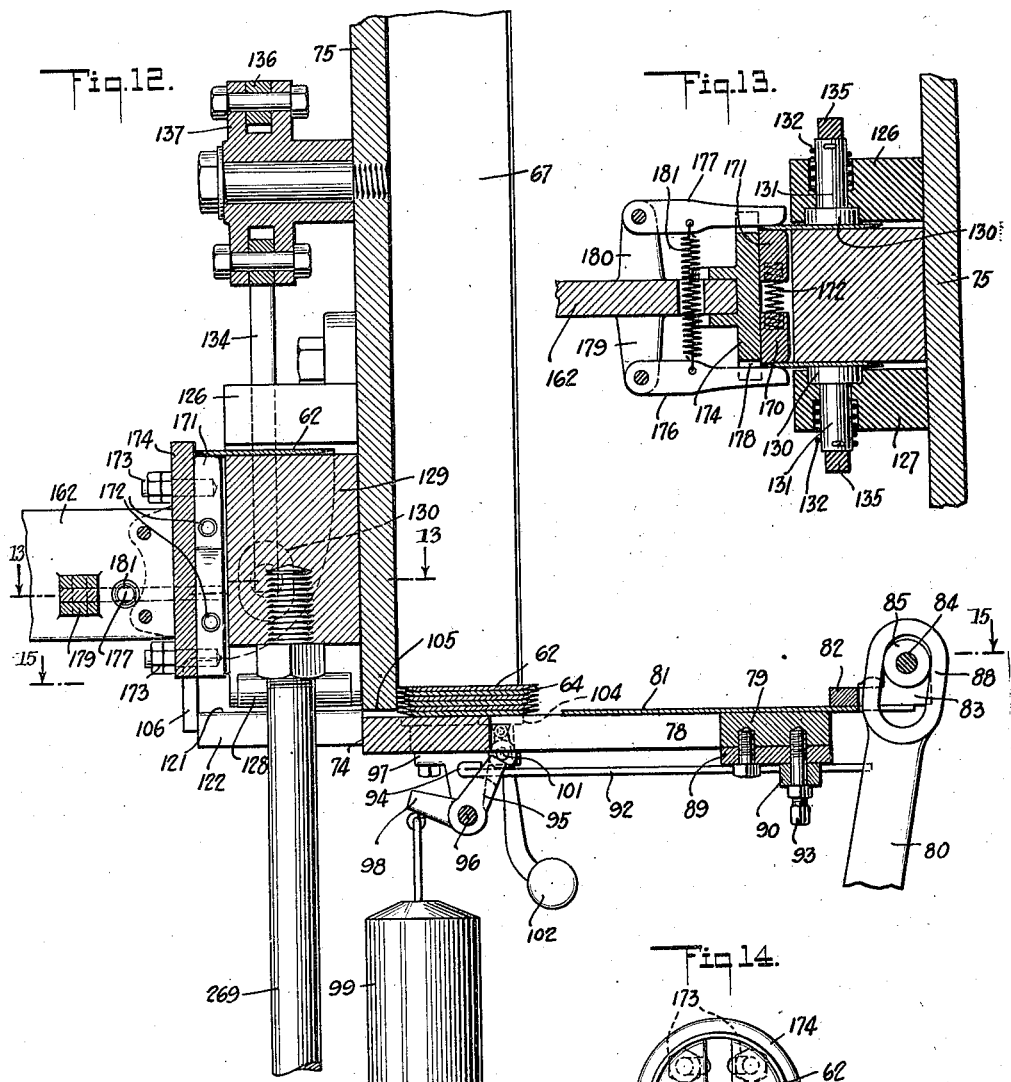

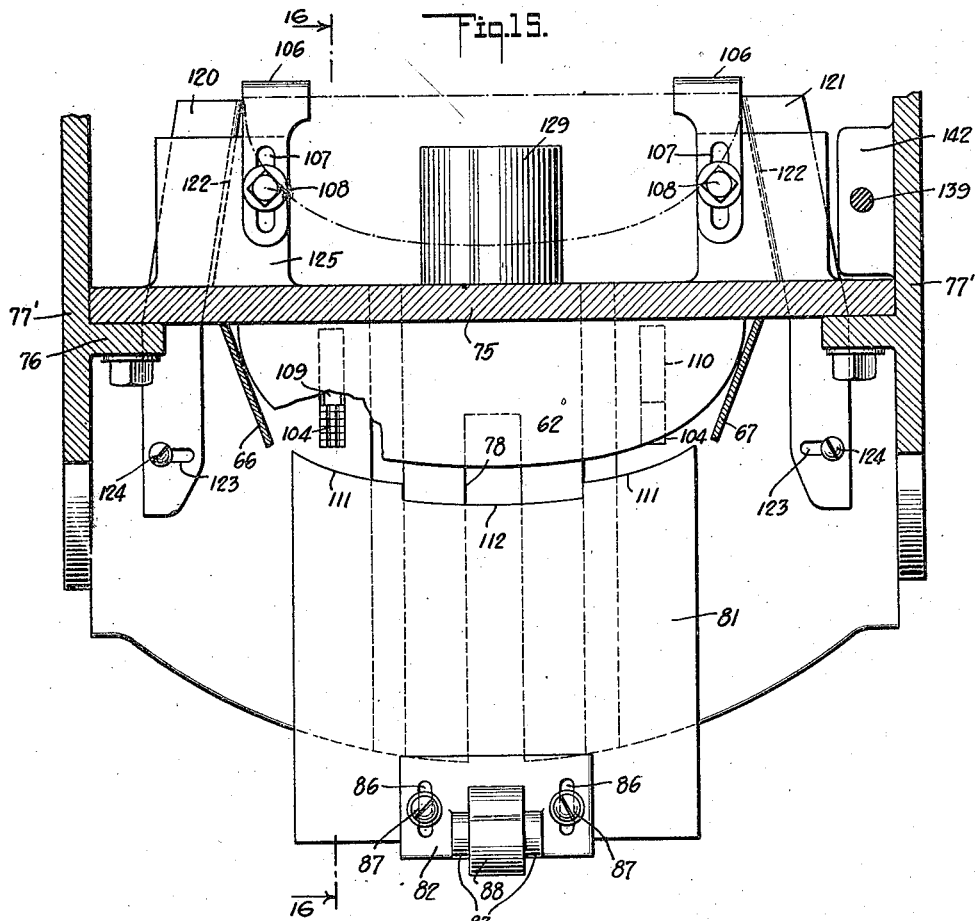
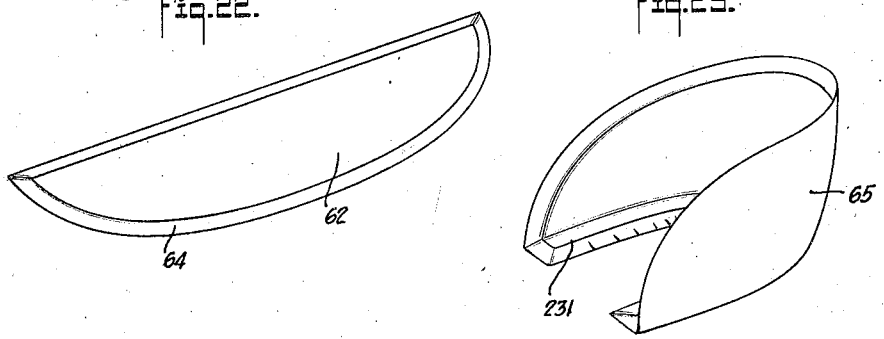

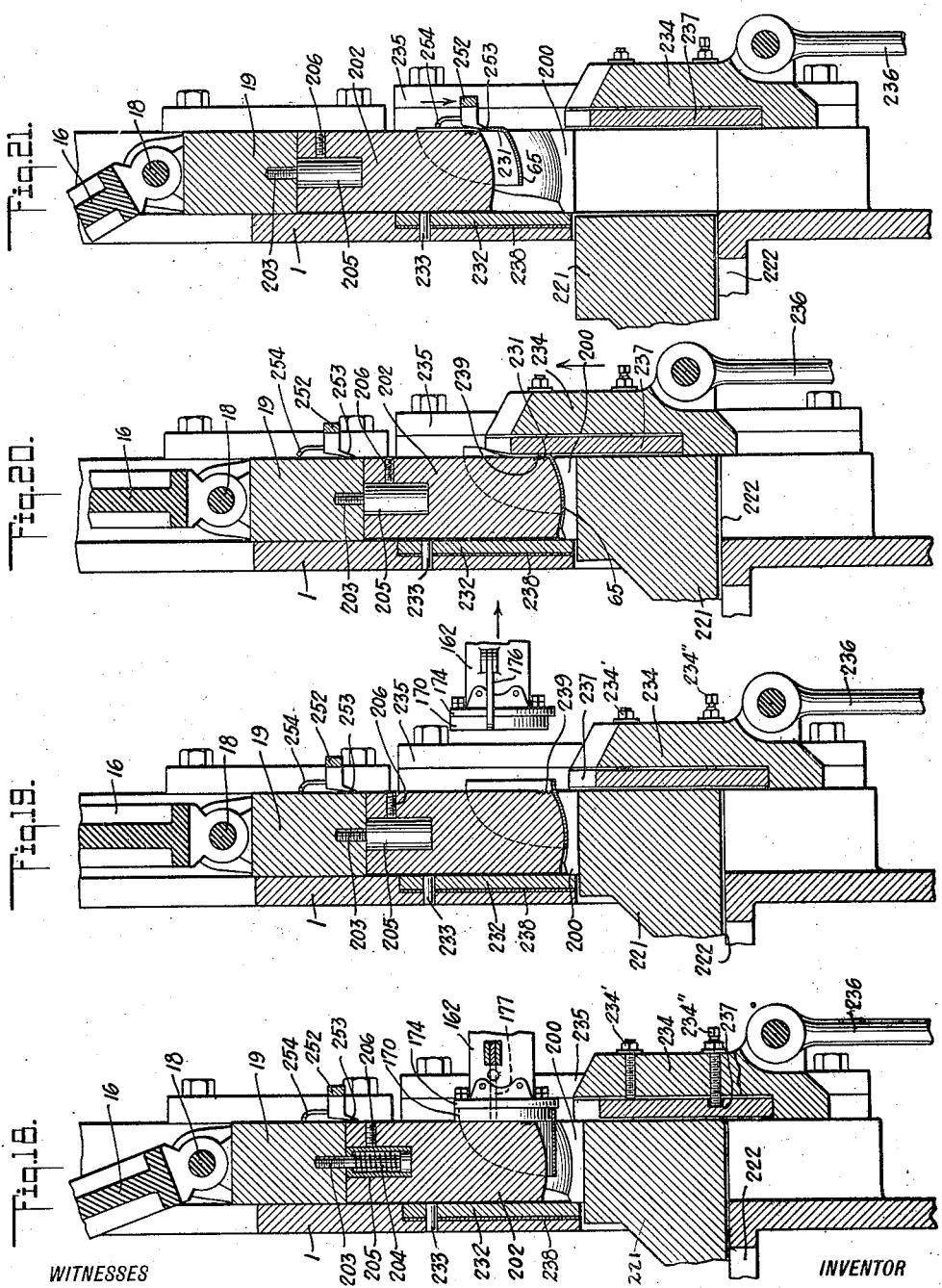

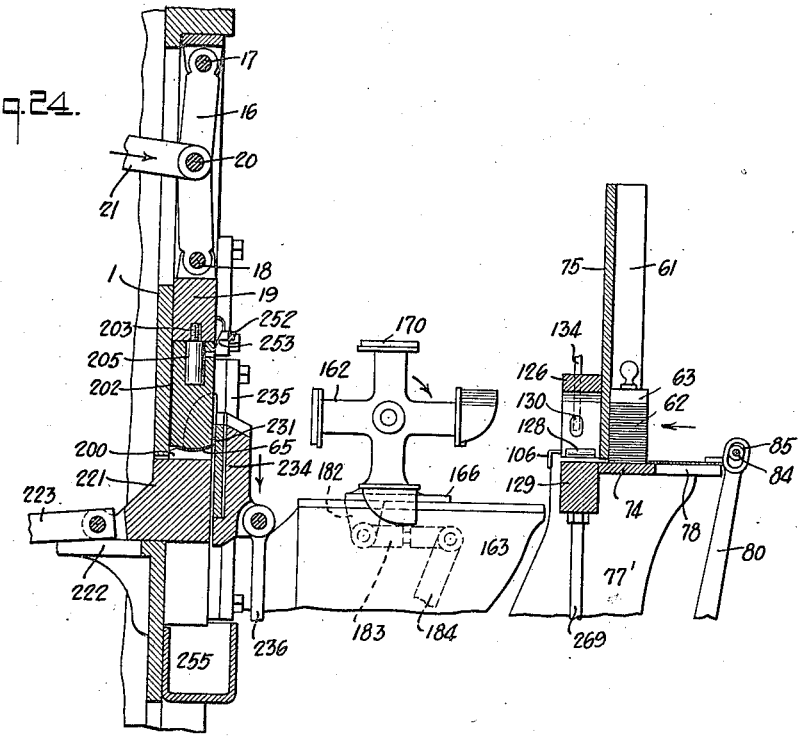

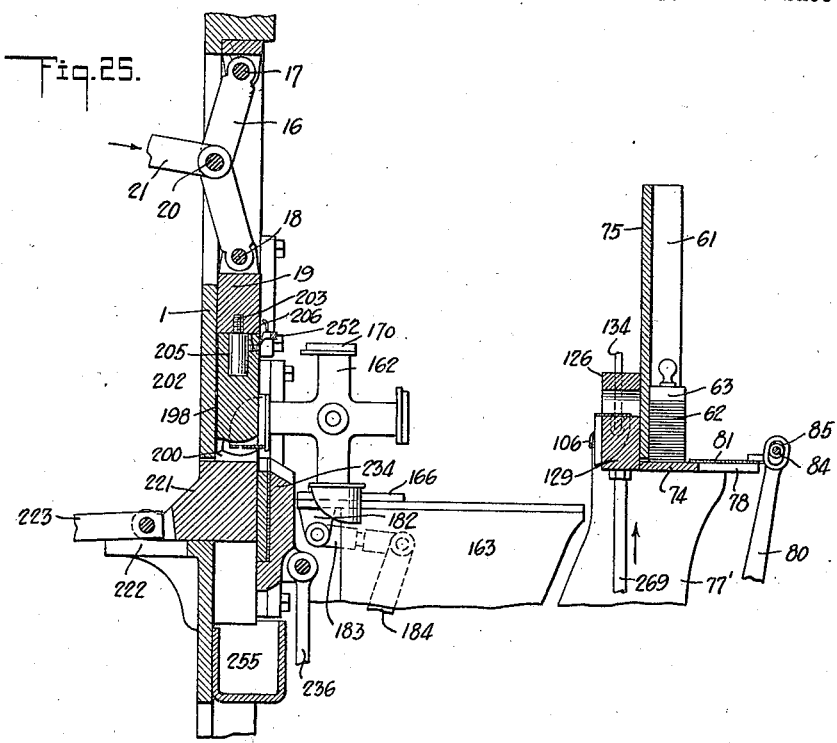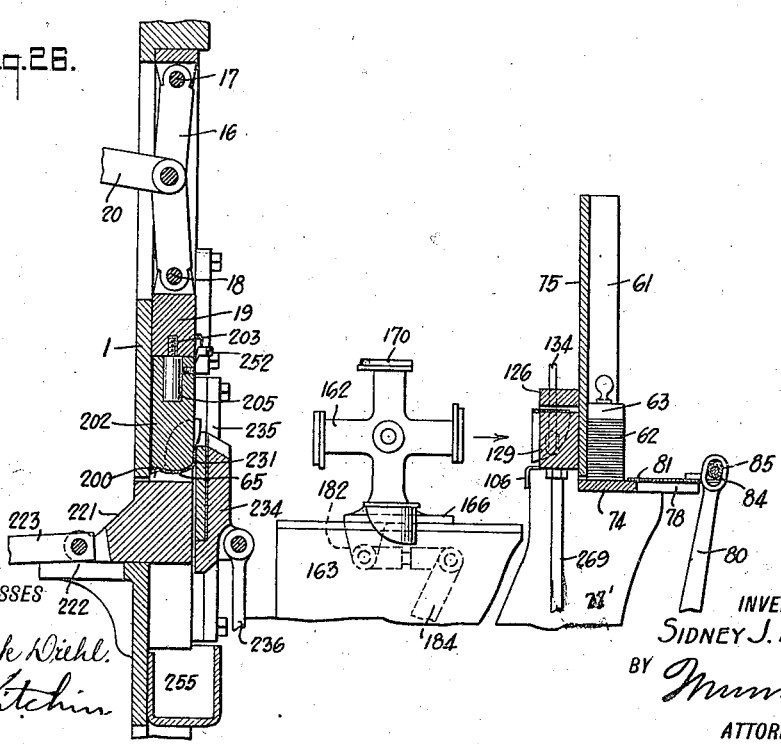

Oct. 16, 1923.

S. J. HEATH 1,471,261

COUNTER MOLDING MACHINE

Filed Dec. 5, 1921     15 Sheets-Sheet 15

WITNESSES
Frederick Diehl.
A. L. Kitchin.

INVENTOR
SIDNEY J. HEATH
BY Munn & Co
ATTORNEYS

Patented Oct. 16, 1923.

1,471,261

UNITED STATES PATENT OFFICE.

SIDNEY JOHNATHAN HEATH, OF JOHNSON CITY, NEW YORK.

COUNTER-MOLDING MACHINE.

Application filed December 5, 1921. Serial No. 519,995.

*To all whom it may concern:*

Be it known that I, SIDNEY J. HEATH, a citizen of the United States, and a resident of Johnson City, in the county of Broome and State of New York, have invented a new and Improved Counter-Molding Machine, of which the following is a full, clear, and exact description.

This invention relates to machines for forming articles such as counters for footwear and is illustrated as embodied in an automatically operating machine for forming and molding flat blanks into such counters.

In previous machines of this type it has either been necessary for an operator to bend each blank to approximately its final form before placing it in the machine, or else to provide complicated bending devices which do not operate with entire satisfaction and which require constant attention and care.

An object of the present invention is to obviate these difficulties by providing improved and greatly simplified means for presenting blanks bent approximately in the desired form in position to be compressed and molded into finished articles such as counters.

In the illustrated embodiment of the invention a co-operating die and former bend the blanks successively into a substantially U-shaped form, and these blanks are automatically grasped by a device which preserves their form while it inserts them between members which co-operate to compress each blank to form a finished article. Preferably the transferring device is arranged between the bending means and the compressing means, and may operate by grasping the projecting margin of each blank as it is bent, and then moving to reverse the blank and insert it between the compressing members with the margin projecting therefrom in position to be bent over by a suitable flange forming device to complete the counter.

A further object of the invention is to improve automatic machines of this character by simplifying the various parts and by so arranging them with respect to one another as to reduce the undesirable multiplication of parts which has been a feature of earlier machines. Thus a magazine for flat blanks, and an improved feeding device therefor, are arranged immediately adjacent the above-described bending means to push the flat blanks automatically between the co-operating die and former, and accurately to position them with respect thereto. An improved form of die and former is also provided for bending the blanks, embodying yieldingly actuated clamp members operating through the sides of the die to press each blank against the sides of the former in position to be withdrawn by the above-described transfer device. This makes it possible to use a single bending device for a considerable range of sizes of blanks and shapes of counters.

Other features of the invention are to be found in an improved blank feeding mechanism, a novel transfer device for reversing the bent blanks and presenting them to the compressing or molding members, an improved arrangement of novel compressing members to form a mold for completing the formation of the counters, and in various other specific constructions and novel combinations of parts which will be apparent from the following description of the embodiment of my invention illustrated in the accompanying drawings.

A further object of the invention is to provide a counter forming machine in which flat blanks are given a preliminary bending and then molded in a power operated mold until they have assumed the correct shape.

A still further object is to provide a counter forming machine in which a mold is provided for pressing blanks into proper shape, the mold being associated with means for successively supplying blanks in a bowed or bent shape.

In the accompanying drawings—

Figure 2 is a side view of the machine shown in Figure 1.

Figure 3:
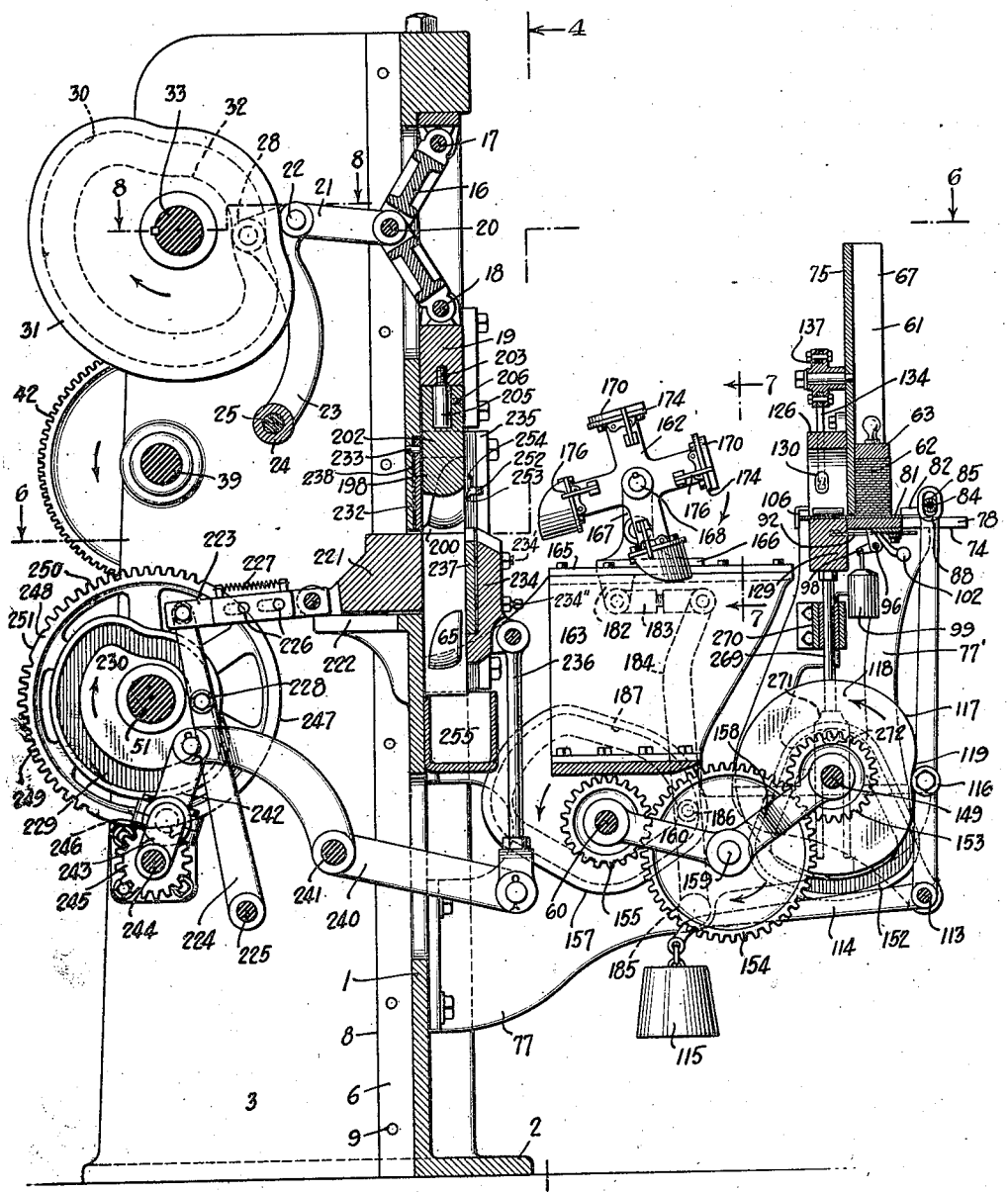
Figure 3 is a vertical sectional view through Figure 1 approximately on line 3—3.
Figure 3A:
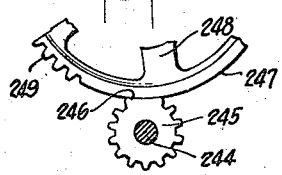

Figure 3ᴬ is a detail of part of the gearing shown in Figure 3.

Figure 4:
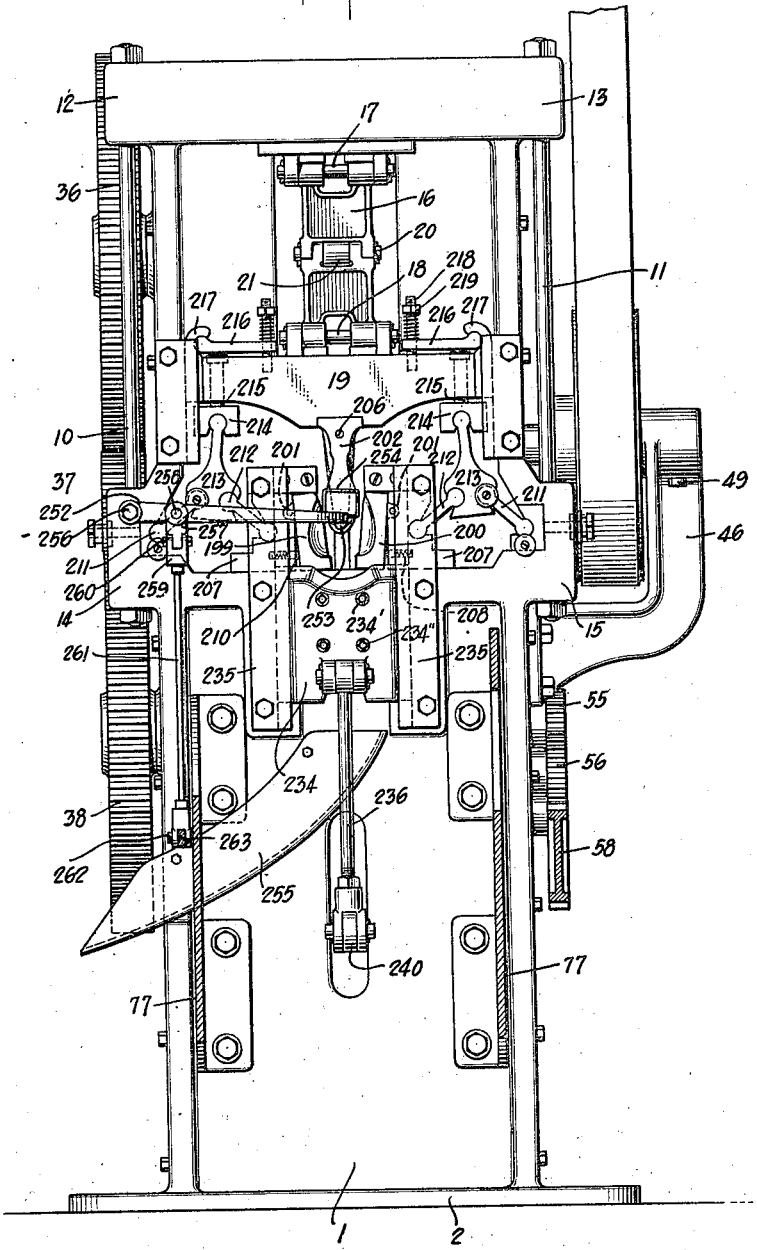

Figure 4 is a sectional view through Figure 3 approximately on line 4—4.

Figure 1:
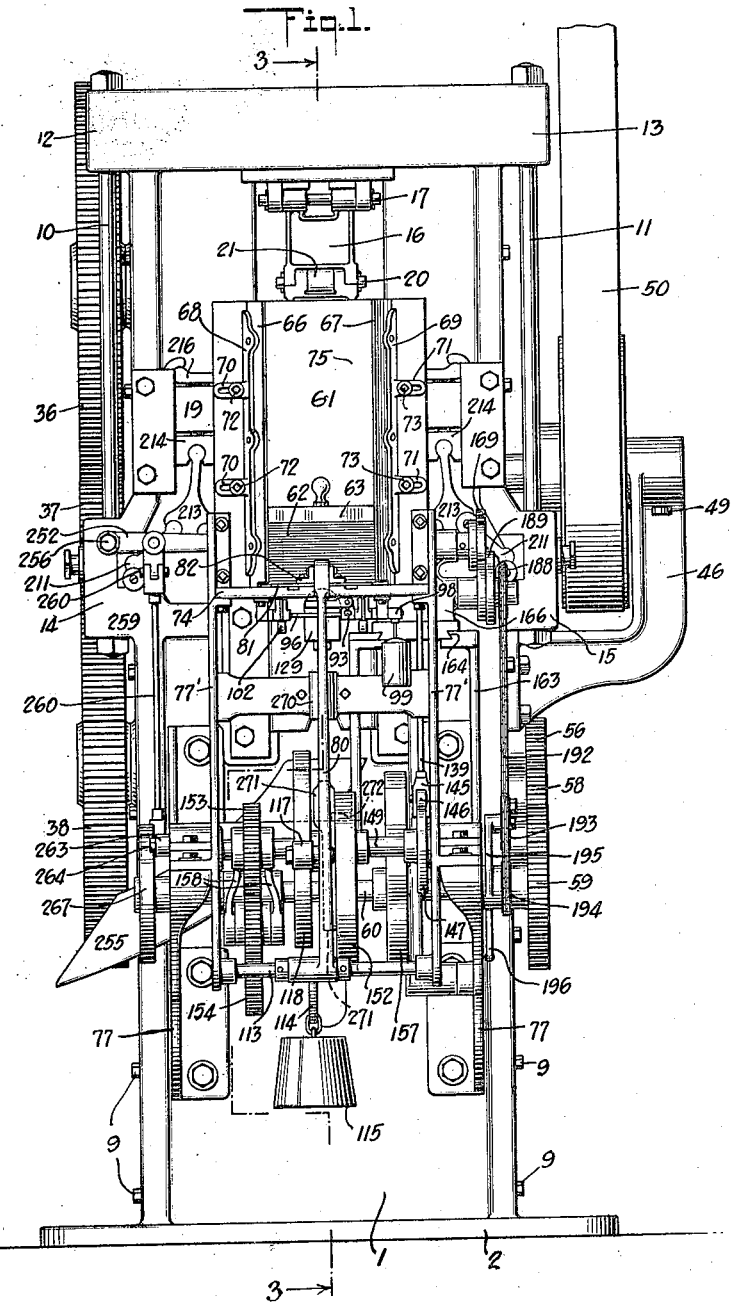
Figure 1 is a front view of a molding machine disclosing one embodiment of the invention.

Figure 5 is a rear view of the structure shown in Figure 1.

Figure 6 is a substantially horizontal sectional view through Figure 3 approximately on line 6—6.

Figure 7 is an enlarged detail fragmentary sectional view through Figure 3 on line 7—7.

Figure 8 is an enlarged detail fragmentary horizontal sectional view through Figure 3 on line 8—8.

Figure 9 is a view on an enlarged scale of the central part of Figure 4 but with the parts in a different position.

Figure 10 is a view in elevation on an enlarged scale showing the molding dies and plunger embodying certain features of the invention, said elevation being taken approximately on line 10—10 of Figure 2.

Figure 11 is a view similar to Figure 10 but showing the parts in a closed or operated position.

Figure 12 is a sectional view through Figure 11 approximately on line 12—12.

Figure 13 is a horizontal sectional view through Figure 12 approximately on line 13—13.

Figure 14 is a face view of the grippers shown in Figures 12 and 13.

Figure 15 is a fragmentary sectional view through Figure 12 approximately on line 15—15.

Figure 16 is a fragmentary sectional view through Figure 15 on line 16—16.

Figure 17 is a view similar to Figure 16 but showing the parts in a different position.

Figure 18 is a fragmentary vertical sectional view through the mold and associated parts shown in Figure 11, said mold and associated parts being in the counter receiving position.

Figure 19 is a sectional view similar to Figure 18 but showing the parts in a clamping position.

Figure 20 is a view similar to Figure 19 but showing the wiping block or plate about to complete its wiping operation.

Figure 21 shows the mold in an open position with the ejector or doffing member operating to disengage the finished counter from the forming plunger of the mold.

Figure 22 is a perspective view of a blank used in forming a counter.

Figure 23 is a perspective view of the counter after it has been completed.

Figure 24 is a fragmentary sectional view showing substantially an outline of the transfer mechanism moving a bent blank toward the forming mold.

Figure 25 is a view similar to Figure 24 but showing the parts in a further advanced position with the bent counter being inserted into the mold.

Figure 26 is a view similar to Figure 24 but showing the parts in a further advanced position with the wiper completing the formation of the counter.

Figure 27:
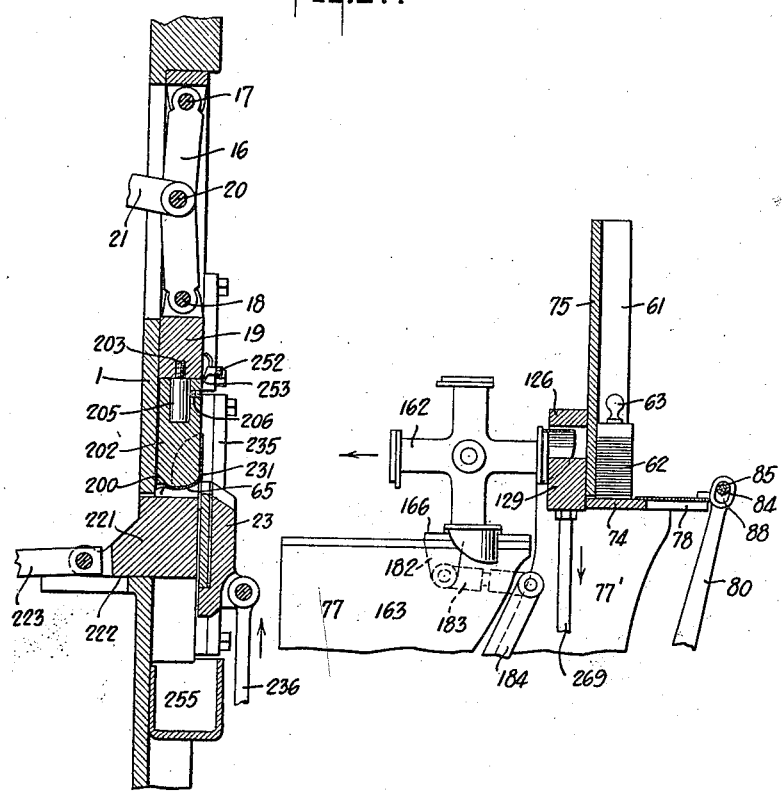

Figure 27 is a view similar to Figure 26 except that the parts have been moved so that the wiper is withdrawn to an inoperative position preparatory to having the finished counter doffed.

Figure 28 is a view similar to Figure 26 but showing the parts in the position where a finished counter is being ejected and a new one is about to be inserted into the forming mold.

In constructing machines for forming or molding counters for shoes, a number of different devices have been provided, most of which involve some form of preliminary operation, as for instance, bending of the counter. Also, in the machines heretofore used, the operation is comparatively slow.

In avoiding the disadvantages of such machines, the present invention contemplates the provision of a machine of an entirely new type. The embodiment thereof illustrated in the drawings comprises generally a magazine for flat counter blanks, feeding mechanism to deliver blanks successively from the bottom of the magazine, a preliminary mold to receive and bend the blanks, a transferring device to seize the bent blanks and present them in position for further molding, a final mold to finish the shaping of the blanks to form molded counters, and mechanism to eject the finished counters.

In the illustrated machine, it is aimed to provide a completely automatic mechanism which will automatically feed from the magazine and which will so operate that blanks will be taken successively from the magazine, transported to the molds, formed by the molds into proper shape and then ejected in such a manner as to be discharged out a given chute. In producing a suitable supporting frame for an improved structure which will effectively operate in the manner described, a front plate 1 is provided preferably having a foot or base 2. The plate 1 is associated with side plates 3 and 4 (Fig. 6), said side plates in turn being provided with feet or base members 2' and 2". The front plate 1 is provided with a pair of vertical flanges 5 and 6 fitting into the notches 7 and 8 formed in plates 3 and 4 whereby the respective bolts 9 may readily secure the front plate and the two side plates 3 and 4 rigidly together. These three plates form a supporting frame which may be merely resting on a suitable support or may be secured to a support. As the upper part of the front plate 1 is subjected to a strain in a vertical direction, tension bolts 10 and 11 extend through the enlargements 12 and 13 arranged on each edge of plate 1, said tension bolts extending from the top of the plate to near the center as shown in Figure 4. Near the center of the machine, enlargements 14 and 15 are provided through which the bolts 10 and 11 pass. This reinforcing structure of the front plate takes care of the strain produced by a toggle 16, (Fig. 3) which is journaled at 17 and 18 so as to give a vertical thrust to a cross bar 19, which operates certain mechanism hereinafter fully described.

The toggle 16 is provided with two toggle links pivotally connected together by a pivotal pin or rod 20 on which is also pivoted a link 21, which link in turn is pivoted at 22 onto the arm 23. Arm 23 is pivoted at 24 on a suitable shaft 25 secured to side plates 3 and 4, which side plates are provided with suitable bosses for receiving the shaft. Arm 23 (Fig. 8) is not only provided with ears 26 for receiving the end of link 21, but is provided with ears 27 for receiving a pintle on which rollers 28 and 29 are journaled. The roller 29 operates in a groove 30 formed in the cam 31 while the roller 28 operates against the outer cam surface 32 of the cam 31. The roller 29 acts in conjunction with the cam 31 as means for pulling the link 21 while the roller 28 co-acts with the cam face 32 for pushing the link 21 in order to cause an actuation of the toggle 16 for moving the cross bar 19 as it performs its work. The cam 31 is rigidly secured to a shaft 33, which shaft is journaled in suitable bosses 34 and 35 in the plates 3 and 4, said shaft passing through plate 3 in order that the power gear 36 may be rigidly secured thereto adjacent the outer face of the plate. The power gear 36 meshes with a power pinion 37 which pinion also meshes with a second power gear 38. The power pinion 37 is rigidly secured to a shaft 39 journaled in the bosses 40 and 41 and extending entirely through plates 3 and 4. A driving gear 42 is loosely mounted on shaft 39 (Figs. 2 and 5), said driving gear meshing with a driving pinion 43 rigidly secured to the shaft 44, which shaft has a combined pulley wheel and fly wheel 45 rigidly secured thereto. The shaft 44 is journaled in the plate 4 and a suitable bracket 46 bolted or otherwise rigidly secured to plate 4.

The driving gear 42 is provided with a hub section 47 having a clutch face adapted to interlock with the clutch sleeve 48, which clutch sleeve is splined on shaft 39. A shifting lever 49 is journaled in the bracket 46 and extends to a convenient point near the front of the machine whereby the clutch sleeve 48 may be thrown into and out of clutching position at any time so as to throw the power in and out. The combined pulley and fly wheel 45 is driven from any suitable source of power, as for instance, by a belt 50 operated in any suitable manner. Whenever the driving shaft 39 is operating, the power gears 36 and 38 will be rotated. Power gear 38 is rigidly secured to shaft 51 which is journaled in suitable bosses 53 and 52 and which extends entirely through side plates 3 and 4 so that at the end opposite that carrying gear 38, an auxiliary power gear 55 is provided and rigidly secured in place. The auxiliary power gear 55 meshes with an idler 56 journaled in a suitable stub shaft 57 and said idler in turn meshes with a second idler 58 journaled on a suitable stub shaft carried by plate 4. The idler 58 meshes with a gear wheel 59 rigidly secured to shaft 60, which shaft operates certain mechanism hereinafter fully described.

It will be seen that power is transmitted to the machine at the rear and from thence is distributed from the rear to the various moving parts in such a manner as to produce positive action of the various parts in proper timed relation. Power is transmitted, as hereinafter fully described, to the automatic feeding mechanism shown at the right in Figure 3, to the permanent bending mechanism arranged adjacent the feeding mechanism, to the carriage or transferring mechanism, to the mold, to the wiping mechanism and to the ejecting or doffing mechanism. These various mechanisms will now be described in the sequence just set forth, which sequence follows the natural action of the machine.

The feeding mechanism includes a magazine or hopper 61 which is substantially a U-shaped structure and ordinarily carries a stack of blanks 62 (Fig. 3), said blanks being held properly in place by a suitable follower or weight 63. These blanks are previously prepared so as to appear as shown in Figure 22. It will be noted that the blanks are formed with one straight edge and a substantially arc-shaped edge with beveled portions 64, which beveled portions are turned inwardly as shown in Figure 23 when the complete counter 65 is finished. In order to properly center and hold in place the blanks 62, side plates 66 and 67 are provided, said side plates being carried by suitable castings 68 and 69 having slotted ears 70 and 71 which accommodate clamping bolts 72 and 73 whereby the side plates 66 and 67 may be adjusted toward and from each other to hold and guide in proper position different size blanks. The magazine 61 rests on a platform 74 and if desired, may be integral therewith. Preferably, the platform 74 is formed separate from the front wall 75 of the magazine 61 and said front wall is bolted to suitable flanges (Fig. 15) whereby the parts are properly held in place, said flanges forming part of a front bracket 77' bolted or otherwise rigidly secured to the bracket 77. The platform 74 is provided with an elongated notch 78 arranged centrally thereof, said notch accommodating a guiding block 79 and the actuating lever 80. A feeding plate 81 of thin metal is rigidly secured in any suitable manner with the block 79 and has secured thereto an auxiliary plate 82 provided with a pair of ears 83 which accommodate a pin 84 on which an anti-friction roller 85 is mounted. The auxiliary plate 82 is provided with slots 86 (Fig. 15) through which the clamping bolts 87 pass whereby this plate may be adjusted. The actuating lever 80 is provided with a slotted end 88 which accommodates the roller 85. A retaining plate 89 is bolted or otherwise secured to the block 79, said block accommodating an arm 90 provided with a shoulder 91 fitting against one edge of the plate 89 whereby when said arm is bolted rigidly to the plate 89 it cannot move independently of said plate and as said plate is rigidly secured to block 79, the arm must move with said block and the feeding plate 81.

A rod 92 extends through one end of the arm 90 and is rigidly clamped to said arm by a suitable set screw 93, said rod having an enlargement 94 at one end so as to be engaged by the lever 95 through which the rod loosely extends. Lever 95 is rigidly secured to a shaft 96 journaled in suitable brackets 97 secured to the platform 74. A power lever 98 is rigidly secured to shaft 96, said power lever carrying a weight 99 whereby shaft 96 is given a continuous tendency to rotate in a given direction and to pull rod 92. Shaft 96 also carries a pair of levers 100 (Figs. 16 and 17), which levers are preferably bifurcated at their outer ends so as to receive a pin 101 extending through a weighted lever 102, said weighted lever having an extension 103 pivotally connected with a feeder foot 104, which feeder foot is roughened or toothed on the upper edge to engage and force, in a given direction, the lowermost blank 62. As the actuating lever 80 moves forward, together with the parts connected therewith, the feeding foot 104 will be also moved as rod 92 is moved. The movement of rod 92 caused by lever 80 will permit the weight 99 to rock the shaft 96 and, consequently, to move the feeding foot 104 until it assumes the position shown in Figure 17. When this position has been assumed, the feeding foot ceases to operate but rod 92 and the feeding plate 81 continue to move forward until the feeding plate 81 has forced the lowermost blank 62 through the slot 105 and against the stops 106. These stops (Fig. 15) are provided with slots 107 for accommodating the respective bolts 108 whereby the stops may be adjusted to suit the various conditions.

As indicated in Figure 15, the various members or feet 104 are comparatively narrow and operate in suitable slots 109 and 110. It will also be noted that the feeding plate 81 is provided with an arc-shaped face 111 which is offset at 112 so that two spaced points of contact will be provided for forcing the blanks in the slot 105. The actuating lever 80 is pivoted at 113 (Fig. 3) on part of the bracket 77', said lever being formed with a counterbalancing arm 114 carrying a weight 115, said weight continually acting to cause the arm 80 to move to the position shown in Figure 28. A roller 116 is rotatably mounted on the actuating lever 80, said roller operating against the cam face 117 of the cam 118. This cam face is provided with a single depression 119 whereby upon each revolution of the cam 118, the lever 80 will be given one back and forth movement, said lever being positively withdrawn or moved to a starting point by the cam and actuated for forcing a blank against the stops 106 through the action of the weight 115. In order that the blank may be properly centered when engaging the stops 106, guiding or centering members 120 and 121 are used, said guiding or centering members being formed from flat plates of metal as shown in Figure 15 with one edge 122 turned down (Fig. 10.) A slot 123 is provided in each of the members 120 and 121, said slots accommodating suitable clamping screws 124 whereby the guiding members are clamped properly in any adjusted position.

The wall 75 is formed with projections 125 and above these projections are arranged bending die sections 126 and 127. These die sections form a complete die as indicated in Figures 10 and 11, said die being of a substantially U-shaped structure. Each of the die sections is provided with slotted ears for receiving suitable bolts whereby it may be adjustably clamped to the wall 75. These slots permit the adjustment of the die sections for receiving larger or smaller counters by changing the plunger 129. A roller 128 is provided on each section at the entrance so that when the bending plunger 129 moves upwardly and forces a blank into the die as shown in Figure 11, said blank will be guided and gradually folded by the action of these rollers and the plunger 129. This plunger is carried by rod 269 guided in a suitable guiding structure 270 (Fig. 10) and carries at its lower end a bifurcated fitting 271 which straddles the shaft 149 and which carries a rollers 272 projecting into the groove in cam 152 whereby the plunger is properly operated as this cam is moved by a shaft 149. Preferably, the plunger 129 is made appreciably smaller than the die so that there will be a space, not only between the plunger and die, but also between the die and the blank when the parts are in the position shown in Figure 11. This permits blanks of different thicknesses to be readily used while at the same time the various blanks are correctly bent into a U-shaped structure, said bending, of course, being merely a preliminary bending. A gripping shoe 130 co-acts with each of the die sections 126 and 127, each of said gripping shoes being connected with a plunger 131 normally held in the position shown in Figure 10 by a suitable spring 132. It will be understood that both of these shoes 130 and associated parts are identical, so that the description of one will apply to both.

The section 127 is provided with an ear 133 on which is pivotally mounted a lever 134 arranged so that the short end 135 will engage the plunger 131 for moving the same against the action of spring 132. A suitable link 136 is pivotally connected to the long end of lever 134 and also pivotally connected to the cross bar 137, which cross bar is rigidly secured to arm 138, which arm is provided with a suitable aperture in the end for accommodating the operating rod 139. A spring 140 surrounds rod 139 and presses against the arm 138 and against an adjustable stop 141 whereby the arm 138 and associated parts are resiliently moved in one direction, namely, so that the gripping shoes 130 may grip the blank as shown in Figure 11 but it is positively moved in the opposite direction by the return movement of the rod 139. This rod is guided by a suitable guiding lug 142 which is used an an abutment for the spring 143, which spring surrounds rod 139, and presses against the adjustable sleeve 144. The spring 143 acts as means for returning or assisting in returning rod 139 and associated parts to their normal position which is shown in Figure 10. This rod extends downwardly and is bifurcated at its lower end so as to receive a pin 145 (Figs. 1 and 2) whereby a suitable roller 146 may be mounted thereon and operate against the gripper cam 147. As shown in Figure 2, this cam is formed as a disk with an arc-shaped surface merging into two inclined surfaces connected by a short arc-shaped surface 148. By reason of this structure, the rod 139 and parts associated therewith will be held stationary for half a revolution of the shaft 149. The bifurcated end of rod 139 is provided with an ear 150 extending into a suitable bifurcation in link 151 to which it is pivotally connected by a suitable pin while the link 151 is pivotally connected to part of the bracket 77'. The shaft 149 is rigidly secured to cam 118, cam 147, cam 152 and with pinion 153 (Fig. 3). Pinion 153 meshes continually with an idler gear 154, which idler gear also continually meshes with a pinion 155 rigidly secured to shaft 60, which shaft is rigidly connected with the cam 157. A link 158 pivotally mounted on shaft 149 carries shaft 159 on which gear 154 is mounted, and is hung from shaft 60 by a second link 160 on each side of the pinion 153 and extends to a central point in respect to the idler gear 154 so as to accommodate a short shaft 159, which shaft also extends through two links 160 pivotally mounted on shaft 60 and extending on opposite sides of the pinion 155 and idler gear 154.

This arrangement presents a toggle joint support for the shaft 159 and, consequently, maintains the idler gear 154 in mesh with both of the pinions 153 and 155 regardless of the movement of pinion 153. The movement of this pinion and shaft 149 and the adjustment of the auxiliary bracket 77' toward and from the front plate 1 raises and lowers gear 154 without carrying it out of mesh with gears 153 and 155. This adjustment is permitted by the fact that the bolts 161 (Fig. 2) extend through slots in the bottom of the auxiliary bracket 77' whereby said bracket may be readily adjusted in respect to bracket 77 and the front plate 1. This adjustment is to provide for the proper space between the bending die and the transfer spider 162.

As above described, mechanism has been provided for feeding flat blanks from the hopper 61 to a position against the stops 106 and also mechanism has been described for giving this flat blank a temporary bending to form the same into a U-shaped structure. After thus bending the blank, it is necessary to remove the bent blank from the bending die and transfer the same to the forming mold. This transfer mechanism is mounted on a centrally positioned bracket 163 bolted or otherwise rigidly secured to part of the bracket 77 and is formed with a groove guide 164 (Fig. 7), part of said groove being formed by the removable plate 165. A carriage 166 is slidingly mounted on the bracket 163 and is provided with a dove-tail structure fitting into groove 164 whereby the carriage may freely reciprocate in said bracket 163. The carriage 166 is provided with an upstanding support 167 carrying a supporting shaft 168 to which a cross 169 of the Geneva movement is secured (Fig. 2). At the opposite end of shaft 168 is secured the transfer spider 162, which spider is provided with four arms as shown in Figure 3 but if desired, the machine could be designed to use a greater or less number of arms without departing from the spirit of the invention.

On each of these arms is provided a gripping structure for gripping the bent blank and pulling the same from the bending die. These gripping members or grippers consist in providing a pair of gripping blocks 170 and 171 (Fig. 14) constantly urged to separate by suitable springs 172. A bolt 173 is arranged at each end of the gripping device and extends through the face plate 174 into the gripping blocks 170 and 171. These bolts extend through suitable slots 175 in the face plate 174 whereby the blocks 170 and 171 may yield or close up on springs 172 so as to allow the counter to assume a proper shape as the molds close over it. The blocks 170 and 171 are normally urged in a given direction by the springs so that the bolts will be normally positioned at one end of the slots 175 and are moved therefrom only when the mold closes. The spring 181 keeps a tension on the counter regardless of the position of the blocks. When the transfer spider 162 approaches the bending die (Fig. 13) the blocks 170 and 171 will enter in the projecting bent blank while gripping arms 176 and 177 will slide over and press against the outer surface of a blank so as to pinch the same against the blocks 170 and 171. These gripping arms are guided in suitable slots 178 formed in the plate 174, which plate is rigidly secured to one of the arms of the spider 162. Arms 176 and 177 are pivotally mounted on suitable brackets 179 and 180 while a retractile spring 181 acts to urge these gripping arms toward each other. When the spider 162 moves over to the right as shown in Figure 3 until it has reached its extreme travel, the blocks 170 and 171 and the arms 176 and 177 will be positioned as shown in Figure 13. When this occurs, the cam 147 will operate to cause the gripping feet 130 to release the bent blank so that as the spider moves back towards the front plate 1, it will carry with it the bent blank and will gradually move the block in the arc of a circle so as to be ready to be inserted into the mold, the mold being in an open position when the spider reaches the mold.

Gripping mechanism as just described is provided for each of the arms of the transfer spider 162 and said spider is adapted to grip a blank and rotate one quarter of a revolution as it moves over to the die. On the return trip towards the bending die, the spider does not rotate. In order to provide a proper back and forth movement for the transfer spider 162, means have been connected with the carriage 166 to properly move the same. These means include a lug 182 extending from the carriage downwardly to which an adjustable link 183 is pivotally connected, said adjustable link being also pivotally connected with an actuating arm 184, which arm is pivotally mounted at 185 on bracket 77. A roller 186 is mounted on the actuating lever 184 and fits into the groove 187 of cam 157 whereby as said cam is rotating, actuating arm 184 will be actuated. The groove 187 is so shaped as to move over and grip the bent blank in the bending die and move back toward the forming die and as it moves the transfer spider is rotated until the bent blank is inserted into the die as shown in Figure 25. The transfer spider remains stationary when in this position until the die closes. Immediately upon the closing of the tie, the transfer spider begins to move back towards the bending die for receiving another blank while the forming die performs its operation and also while the wiping and doffing or ejecting mechanisms perform their operation.

In order to properly rotate transfer spider 162 and at the same time allow the same to freely slide, a sprocket 188 (Fig. 2) is connected with the plate 189 mounted on the stub shaft 190 which stub shaft is carried by the support 167. The plate 189 carries a pin 191 so as to co-act with the cross 169 in the usual manner of devices used in the Geneva movement. By reason of the sliding or back and forth movement of the transfer spider, the distance of shaft 190 and shaft 60 will vary so that not only is the driving chain 192 necessary, but also a take-up sprocket 193. A driving sprocket 194 is rigidly secured to shaft 60 and the chain 192 passes over this sprocket together with the sprockets 192 and 193. The sprocket 193 is rotatably mounted on an arm 195, which arm is loosely mounted on the shaft 60 and is provided with a lug or extension 196 to which a retractile spring 197 is connected, said spring being also connected with the bracket 77 whereby the arm 195 will have a continuous tendency to swing toward the left in Figure 2 and thereby compensate for the difference in distance between the shaft 190 and shaft 60.

The forming mold 198 is formed with a pair of side molding sections 199 and 200, each of said sections having an ear 201 pivotally connected with a block 207 slidingly mounted on the front plate 1 by a suitable pin as shown in Figures 3 and 9. This arrangement permits these mold sections to swing laterally when the mold is being opened. A molding plunger 202 co-acts with the sections 199 and 200 for pressing a blank into proper shape. This plunger is connected with the cross bar 19 by the arrangement shown in Figure 18 consisting of a screw 203, a spring 204 and a casing 205, said casing being locked in place by a suitable set screw 206. The spring 204 acts to hold the forming plunger 202 against the cross bar 19 but will permit a slight separation in case the die sections 199 and 200 are slow in opening. The die sections 199 and 200 are identical and are operated by identical mechanisms so that the description of one will apply to both.

As shown in Figure 9, the ear 201 is pivotally mounted on a sliding block 207, which block is provided with a bore 208 which accommodates a spring 209 acting on a plunger 210, said plunger acting to hold the bottom of the die section in substantially its original position while the upper end is moved transversely of the machine whereby the die sections assume the position shown in Figure 4. This sliding movement of the block 207 is caused by the toggle links 211 and 212, which links are journaled respectively in sliding blocks 214' and the blocks 207. One end of each of the links 211 and 212 is also pivotally mounted in an actuating member or swing 213, which actuating member in turn is pivotally mounted in a sliding block 214 which block carries a shaft or pin 215. As noticed at the right in Figure 9, the block 214' is mounted in the plate 1 so as to be readily adjusted to take up wear on the mold or for any other desired purpose. This block has a bolt 264 screwed therein, said bolt accommodating the nut or adjusting member 265 which was designed to be loosened so that the block 214 may be removed or moved to one side whereby a suitable shim 266 may be inserted in back thereof. After the shim has been placed in position, the nut or clamping member 265 is tightened and the parts are again in position for proper operation. This shaft or pin 215 is acted upon by a lever 216, said lever having one end fitted beneath the hook 217 while the opposite end is provided with an opening through which the pin 218 projects, said pin having nut 219 at one end and a spring 220 acting on the nut and the other end thereof of the lever 216 so as to give them a continuous tendency to move downwardly. This arrangement is provided in order to allow for excessive strains. Where a comparatively thin counter is being formed, the lever 216 will usually not move during its forming operation but where the counter being formed is very thick, this lever swings upwardly against the action of spring 220 and, consequently, relieves the excessive pressure. The blocks 207 are freely slidable and are positively actuated in both directions by their toggle members.

In order to provide a proper support for the bottom of the die sections 199 and 200, an abutment block 221 is provided and guided in a suitable guide-way 222. During the forming operation, the block is in the position shown in Figure 18 but when the counter has been completely formed, this abutment is withdrawn as shown in Figures 3 and 21 whereupon the doffing mechanism may remove the finished counter. In order to actuate the abutment block 221 at the proper time, a link 223 is pivotally connected therewith and with an arm 224, which arm is pivotally connected at 225 to the side plates of the frame. Link 223 is formed into two sections, said sections overlapping and held together by suitable bolts 226, said pins being secured to one of the sections and projecting through slots in the opposite direction. A spring 227 normally holds these sections in a given position. The arm 224 carries a roller 228 extending into the cam groove 229 of the cam 230. This cam is of the proper shape to hold the abutment block 221 beneath the die sections 199 and 200 most of the time and to move said block to an open position as shown in Figure 3 for a sufficient time to permit a proper doffing of the complete counter.

During the operation of the machine, as the toggle 16 is moved the cross bar 19 will be raised and lowered and the forming plunger 202 and the die sections 199 and 200 will be moved in proper timed relationship to engage a blank fed thereto by the transfer spider 162 and then press the same into the desired shape. A plate 232 acts as a back for the mold and is held in place by any suitable means, as for instance, pin 233. In order to take care of different thickness of material, or on account of wear, it is desired to slightly vary the capacity of the mold and a shim 238 is arranged in back of plate 232.

After the mold 198 has performed its functions as above set forth, the wiping mechanism begins to function, in order to turn over the edge of the blank to form a flange 231. This wiping mechanism includes a wiping block 234 guided in suitable guide-ways 235 whereby it may freely reciprocate, said reciprocation being caused by the actuation of the link 236. The block 234 is provided with a notch in which a wiper plate 237 is mounted, which wiper plate may be adjusted toward and from the block by suitable set screws 234' and 234''. Both of these set screws are provided with suitable lock nuts while the set screw 234'' is adapted to extend into a bore in the plate 237. This arrangement allows the wiper plate 237 to be adjusted independently at the top and bottom for taking care of counters of different thicknesses and for taking care of wear on the wiper plate. A plurality of grooves or notches 239 are formed in the forming plunger 202 which co-act with the wiping mechanism whereby when the parts are moved from the position shown in Figure 19 upwardly to the position shown in Figure 20, the wiping mechanism will turn over the edge of the blank to form the flange 231 without pulling the blank out of the mold or without shearing the edge of the blank. The lower portion of the blank is first turned over and the remaining parts are turned over as shown in Figure 20 during the further upward travel of the wiping block. In order that a thorough turning over action may be secured, the wiping block 234 is caused to move twice over the flange 231. This movement is caused by the mechanism shown in Figure 3. The link 236 is pivotally connected with a lever 240, which lever is pivotally mounted on a pin 241 carried by the side plates of the machine, said lever being pivotally connected with a link 242, which in turn is pivotally connected with a crank 243 rigidly secured to shaft 244. A specially constructed pinion 245 is rigidly secured to shaft 244, said pinion having one flat portion 246 for engaging the smooth surface 247 of the gear wheel 248. It will be noted that the gear wheel 248 has spaced gear sections 249 and 250 with a short smooth section 251 arranged therebetween. These gear sections are so proportioned in regard to the number of teeth on the pinion 245 as to cause said pinion to give one rotation for each gear section and on each revolution of the pinion 245, the wiper block 234 will move upwardly and downwardly one complete cycle. In this way, one revolution of the shaft 51 and, consequently, one revolution of the gear wheel 248 will produce two wiping actions of the wiping block 234. These wiping actions are timed to take place just before the abutment block 221 is moved to an open position as shown in Figures 3 and 21.

After the wiping action has been completed, the abutment block 221 begins to move to an open position and the doffing mechanism begins to operate. This doffing mechanism is provided with a doffing or ejecting arm 252 (Figs. 9 and 21). This arm is formed with a finger 253, which finger is preferably sharpened so as to readily move beneath the flange 231 and at the same time press said flange and in fact the entire counter downwardly. A retaining or guiding frame 254, preferably of wire, is carried by arm 252 which engages the surface of the flange 231 and prevents tilting action of the counter whereby the counter is forced directly downward until it drops past the abutment 221 and into the discharge chute 255. This chute is at a sufficient angle to permit the counter to move by gravity to a suitable discharge point at one side of the machine. The doffing arm 252 is pivotally mounted at 256 on the frame of the machine and has a U-shaped member 257 pivotally connected thereto at 258, which U-shaped member is formed with a tongue fitting into the bifurcated member 259 whereby a suitable pivotal pin 260 may connect these parts and form with the connection means 258 a substantially universal joint or connection to take care of any side movement. Member 259 is connected with an actuating rod 261, said rod extending downwardly to near the chute 255 where it is pivotally connected at 262 to the actuating lever 263, which lever is pivotally mounted at 264 to part of the bracket 77. A roller 265 is rotatably mounted on the actuating lever 263 and projects into the groove 266 of cam 267 and as said cam is formed annular except at one point where it is offset, as for instance, point 268, the lever 263 will remain stationary except when reaching point 268 whereupon it will be given a quick downward and upward movement. This cam is secured to the shaft 60 and, consequently, the cam is properly timed to produce this quick action of lever 263 and, consequently, quick doffing action of arm 252. As soon as this doffing action has been completed, the cam 230 will return the abutment block 221 and the parts are in a position for again receiving a new bent blank from the transfer spider 162, which by this time, is almost in a position for inserting a new blank.

In operation, the machine may be driven by any suitable power and said power is transmitted to the machine through the belt 50 as shown in Figure 2. Prior to the starting of the machine, a quantity of blanks 62 are arranged in the magazine 61 and usually these blanks are placed in position manually. After the hopper has been supplied with blanks and the machine started, the actuating lever 80 will move the feeding plate 81 for forcing the lowermost blank against the stops 106. The feeding feet (Figs. 16 and 17) assist in this operation so that only one blank will be fed at a time. The bending die will then perform its function for producing a preliminary bending and for properly positioning the bent blank so that one set of gripping members positioned on the transfer spider 162 will grip the bent blank and transfer the same to the mold 198. The transfer spider will hold the bent blank until the forming plunger 202 has tightly pressed against the blank. When this has been done, the transfer spider will move back to receive another blank. Meanwhile, the die 198 will have properly pressed the first blank into shape and following this the wiper block 234 will wipe over one face of the forming plunger 202 for bending over and forming the flange 231. When the counter has thus been completely formed, the die sections 199 and 200 move apart and the forming plunger 202 begins to move upwardly while the doffer removes or doffs the finished blank and said blank falls past the abutment block 221 which has been moved out of the way. This operation is repeated continually as long as the machine is in operation.

While I have illustrated and described one embodiment of my invention, it is not my intention to limit its scope thereby, or otherwise than by the terms of the appended claims.

What I claim is:—

1. A counter forming machine comprising a mold for forming the counter, preliminary bending mechanism for bending a blank into a substantially U-shaped structure, means for feeding blanks to said preliminary bending mechanism, means for grasping the side edges of the blank bent thereby and transferring the blanks while bent to said mold, and means for doffing the finished counters from said mold.

2. A forming machine comprising, in combination, co-operating formers to bend blanks into a preliminary U-shaped form, a mold to compress them into final form, and a transferrer provided with means to grasp each blank on opposite edges when it is bent by the formers and to transfer it to the mold when it is released by the formers.

3. A forming machine comprising, in combination, co-operating formers to bend blanks into a preliminary form, a mold to compress them into final form, and a rotatable transferrer between the formers and mold to engage each blank as it is bent and on its release by the formers to partly rotate and thereby reverse it and insert it in the mold.

4. A forming machine comprising, in combination, a co-operating stationary die and reciprocating plunger for bending blanks into a substantially U-shaped structure, rotatable means to compress blanks bent thereby, and means to present blanks successively to said die and plunger and to said compressing means.

5. A forming machine comprising, in combination, a stationary die and a reciprocating plunger for bending blanks transversely until the side edges of the bent blank will be substantially parallel, means to compress blanks bent thereby, and intermittently rotatable means to transfer blanks successively from said die and plunger to said compressing means.

6. A forming machine comprising, in combination, a co-operating die and plunger for bending blanks, a co-operating die and plunger and a flange former to compress blanks bent thereby to mold them into counters, and means between the bending die and the compressing die to grasp each blank by its projecting margin as it is bent and to reverse it and insert it between the compressing die and plunger with its margin projecting to be acted on by the flange former.

7. A machine as defined by claim 6, in which said means comprises a blank-holder, and a mounting therefor to turn it to reverse the blank as described.

8. A machine as defined by claim 6, in which said means comprises a blank-holder, and a mounting therefor to turn it to reverse the blank as described, and to move it to withdraw the bent blank from the first die and to insert it in the second die.

9. A forming machine comprising, in combination, a plurality of sets of co-operating forming members moving relatively to one another in a vertical plane and substantially in horizontal alinement with one another, and a horizontally movable and intermittently rotatable transfer device to withdraw a blank from one set of members and present it to another.

10. A forming machine comprising, in combination, a plurality of sets of bending and compressing devices, each consisting of a relatively movable die and plunger, a transfer device to grasp the margin of a bent blank held between the plunger and die of the first set, and mechanism to operate said device to reverse the bent blank and place it between the plunger and die of the second set.

11. A forming machine comprising, in combination, a plurality of sets of bending and compressing devices, each consisting of a relatively movable die and plunger, a transfer device between the sets having means to grasp the margin of a bent blank held between the plunger and die of the first set, and mechanism to turn said device to reverse the bent blank and to reciprocate it to place it between the plunger and die of the second set.

12. A forming machine comprising, in combination, a co-operating plunger and die to bend a blank, and a device to remove a blank therefrom having a portion conforming to the shape of said die to fit inside the projecting margin of the bent blank, and yieldingly mounted members to clamp the blank against said portion.

13. A forming machine comprising, in combination, a co-operating plunger and die to bend a blank, and a device to remove a blank therefrom having a portion substantially conforming to the shape of the die consisting of yieldingly separated parts to fit inside the projecting margin of the bent blank, and means to clamp the blank against said portion.

14. A forming machine comprising, in combination, a plurality of sets of bending and compressing devices, each consisting of a relatively movable die and plunger, means to place flat blanks successively between the plunger and die of the first set, a transfer device to grasp the margin of a bent blank held between the plunger and die of the first set, and mechanism to operate said device to reverse the bent blank and place it between the plunger and die of the second set.

15. In a counter forming machine, a feeding mechanism comprising a supporting structure, a feeding plate for sliding the blanks over said supporting structure, said plate being formed with projecting ends to engage the opposite ends of the curved side of a counter blank and with a central cut-out portion to adapt it to feed blanks of different shapes, and a pivotally mounted arm for moving said plate.

16. In a counter forming machine, a preliminary bending mechanism comprising a die structure formed from a pair of die sections, means for rigidly mounting said die sections in position, a pair of guiding rollers carried by said die sections, an automatically actuated plunger for forcing a blank into said die sections and bending the same, and clamping means for forcing said blank against said plunger.

17. In a counter forming machine, a preliminary bending mechanism comprising a substantially U-shaped die structure, an automatically actuated plunger for forcing a blank into said die structure, and automatically actuated means operating through the die structure for clamping said blank against said plunger when the plunger is in said die structure.

18. In a counter forming machine, a preliminary bending mechanism comprising a die, a plunger for forcing a flat blank into the die and bending the same, a pair of pressing feet for pressing said blank against said plunger, pivotally mounted levers for actuating said presser feet in one direction, means for moving said presser feet in the opposite direction, and means for automatically actuating said levers.

19. In a counter forming machine a preliminary bending mechanism and an automatic feed therefor, said automatic feed including a gripping and feeding foot, means for supplying flat blanks to said gripping and feeding foot, means for actuating said gripping and feeding foot automatically, a pusher plate for sliding the blanks after the actuation of said gripping foot, and means for automatically operating said plate.

20. In a counter forming machine, blank feeding means comprising a guiding hopper for a stack of flat blanks, a platform for receiving said blanks, said platform having an opening therethrough, a shoe positioned to move into and out of said opening, said shoe acting to feed the lowermost blank a short distance, means for giving said foot an arc-shaped motion, a sliding plate co-acting with said foot for giving the lowermost blank an additional movement after the operation of the foot has ceased, and means for reciprocating said plate.

21. In a counter forming machine, an automatic feed comprising means for guiding flat blanks to a given point a feeding plate for moving said blanks a predetermined distance, a pivotally mounted arm connected with said plate, a weight carried by part of said arm for urging the arm in one direction, a member projecting from said arm intermediate its length, and a rotating cam formed to act on said member for moving the arm against the action of said weight whereby as said cam rotates, said arm and plate will have a back and forth movement.

22. In a counter forming machine, an automatic feed comprising a feeding foot adapted to move a flat blank, a pivotally mounted arm for moving said foot substantially in the arc of a circle, an extension projecting from said arm, means acting on said extension for causing said arm to move whenever permitted, a feeding plate co-acting with said foot, a rod provided with a stop connected with said feeding plate, said stop normally preventing the actuation of said pivotally mounted arm by said weight, and means for moving said feeding plate and said arm in a direction towards said foot whereby said arm will be released and said foot will be caused to shift or move the blank prior to the engagement thereof by said plate.

23. In a counter forming machine, an automatic feed therefor comprising a feeding trough adapted to contain a supply of flat blanks, a feeding foot for moving said blanks, a certain distance, a lever pivotally connected with said foot, said lever having a weight at the opposite end, a rocking arm pivotally connected to said lever intermediate the length of the lever, said pivotal connection being near said foot and said weight, an actuating weight connected with said arm for urging the same continually in one direction, and means co-acting with said arm and said foot for releasing the arm at a certain time for permitting the actuating weight to operate the arm and substantially simultaneously give the blank moved by said foot an additional movement.

24. In a counter forming machine, a preliminary forming mechanism including a plunger, a pair of clamping members for clamping the blank against said plunger, a spring acting on each of said clamping members for causing the same to move away from said plunger, a pair of pivotally mounted arms for actuating said clamping members against the action of said springs, and means for actuating said arms, said means including a link and lever mechanism, a rod for actuating the link and lever mechanism, and a cam for actuating said rod.

25. In a counter forming machine, a transfer mechanism, said transfer mechanism including a sliding carriage, means mounted on the carriage for receiving a bent blank, means for rotating the first mentioned means 180° so that the bent blank received will be reversed and means for automatically moving said carriage back and forth.

26. In a counter forming machine, a transfer mechanism comprising a sliding carriage, means for causing said carriage to reciprocate, and a rotatable member on the carriage provided with means for gripping a plurality of blanks.

27. In a counter forming machine, a transfer mechanism comprising a reciprocating carriage, means for reciprocating the carriage, a rotatable transfer spider arranged on said carriage, said spider having a plurality of arms, and a blank gripping mechanism arranged on each of the arms.

28. In a counter forming machine, a transfer mechanism comprising a reciprocating carriage, means for actuating the carriage, a transfer spider rotatably mounted on the carriage, blank gripping members arranged on each arm of the spider, and means for giving said transfer mechanism a quarter of a revolution on each reciprocation, said means including a Geneva movement.

29. In a counter forming machine, a transfer mechanism comprising a reciprocating carriage, means for reciprocating said carriage, a rotatable transfer spider arranged on said carriage, means for rotating said spider step by step, and a plurality of gripping members carried by said spider, each of said gripping members being provided with a pair of blank receiving blocks, and a plurality of gripping arms for pressing a bent blank against said blocks.

30. In a counter forming machine, a transfer mechanism comprising a transfer spider, means for moving said spider in a back and forth direction, means for rotating the spider as it is reciprocated, and a gripping mechanism carried by said spider, said gripping mechanism comprising a structure for receving a blank bent substantially U-shape, and a plurality of gripping members for pressing said blank against the receiving structure.

31. In a counter forming machine, a transfer mechanism comprising a removable transfer structure including a gripping head, said gripping head comprising a face plate having a pair of notches, a pair of blocks mounted on said face plate, resilient means for causing said blocks to separate, and a pair of spring actuated arms extending through said notches for gripping a blank and pressing the same against said blocks.

32. In a counter forming machine, a transfer mechanism comprising a reciprocating carriage, means for reciprocating said carriage, a transfer spider mounted on the carriage, means on the spider for gripping a blank and transferring the blank as the carriage is moved, and mechanism for rotating said gripping means, said mechanism including a Geneva movement, a sprocket wheel for actuating said Geneva movement, a chain for actuating said sprocket wheel, a driving sprocket for actuating said chain, a take-up sprocket, and a pivotally mounted arm carrying said take-up sprocket whereby said carriage may freely reciprocate and the Geneva movement properly operate.

33. In a counter forming machine, a transfer mechanism comprising a reciprocating carriage, means for reciprocating the carriage, a rotatable spider mounted on said carriage, a blank gripping member carried by said spider, a Geneva cross connected with said spider, a disk having a pin co-acting with the cross for rotating the cross and spider, a sprocket connected with said disk for rotating the same, a chain for operating the sprocket, a driving sprocket for operating the chain, a take-up sprocket for maintaining the chain under tension regardless of the position of said carriage, a swinging arm for supporting said take-up sprocket, and a spring acting on said arm for maintaining the arm in such a position as to maintain the chain under tension.

34. In a counter forming machine, a molding mechanism comprising a pair of die sections, a molding plunger, a pair of laterally sliding members for closing and holding said die sections closed, and means for forcing said plunger into said die sections as said die sections close, said means including a toggle joint, and means for opening and closing said toggle joint.

35. In a counter forming machine, a molding mechanism comprising a pair of dies, a slide carrying each die, a molding plunger, toggles connected to the slides for simultaneously moving said dies to a closed position, means for moving the plunger to a closed position, and connections from said plunger moving means to the knuckles of the toggles to close and open the dies.

36. In a counter forming machine, a molding mechanism comprising a pair of molding dies, a molding plunger, a cross bar carrying said molding plunger, means for reciprocating said cross bar and the plunger carried thereby, and a mechanism including a pair of toggles and connections from the toggles to the cross bar for moving the die sections simultaneously with the movement of the plunger.

37. In a counter forming machine, a molding mechanism comprising a die, a forming plunger co-acting with said die, means for actuating said forming plunger, and connecting means for connecting the forming plunger with its actuating means, said connecting means including a spring, and a headed pin encircled by the spring and seated in a recess in the plunger and carried by said actuating means so as to permit the forming plunger to move away from said actuating means a predetermined distance under appreciable strain.

38. In a counter forming machine, a forming mechanism including a pair of die sections, a forming plunger co-acting with said die sections, a bar for moving said forming plunger back and forth between an operative and an inoperative position, members connected to said bar and to the die sections for moving said die sections back and forth between an open and a closed position, and means for compensating for unusual strain.

39. In a counter forming machine, a forming mechanism including a plurality of die sections, a forming plunger, an actuating member for actuating the forming plunger, and members pivotally connected to said actuating member and to the die sections for opening and closing the die sections.

40. In a counter forming machine, a pressing and forming mechanism including a die, a forming plunger co-acting with said die, an actuating member for actuating said plunger, and means for opening and closing the die, said means including a plurality of toggles connected with and actuated by said actuating members.

41. In a counter forming machine, a pressing and forming mechanism including a plurality of die sections, a forming plunger, an actuating member for actuating said forming plunger, and means actuated by said actuating mechanism for opening and closing said die sections in synchrony with the forming plunger, said means including a pair of toggles for each section, and means for connecting the actuating member with said toggles.

42. In a counter forming machine, a forming and pressing mechanism including a plurality of die sections, a forming plunger, means for actuating the forming plunger, means for pivotally and slidingly supporting each of said die sections, a toggle structure for reciprocating said sliding and supporting means whereby the die sections are opened and closed, and means for connecting each of the toggle members with said actuating member, said last mentioned means acting to cause the forming plunger and the die sections to be properly timed in their opening and closing operation.

43. In a counter forming machine, a forming and pressing mechanism including a pair of die sections, a forming plunger co-acting therewith, an actuating member for actuating said plunger, a sliding block for each of said die scetions, means for pivotally mounting the respective die sections on the respective blocks, and means for connecting said blocks with said actuated member, said last mentioned means acting to slide said blocks to an open position as said plunger is moved to an open position and to slide said blocks for moving said die sections to a closed position as the plunger moves to an operative position.

44. In a counter forming machine, a pair of die sections, a forming plunger co-acting therewith, an actuating member for moving the forming plunger, a movable block for each of the die sections, means for pivoting one die section to each of said blocks, means carried by each of said blocks and causing the die sections to swing in a given direction as they are moved to an open position, and mechanism connecting each of the blocks independently with said actuating member so that as the actuating member is operated for moving said plunger the die sections will be moved correspondingly.

45. In a counter forming machine, a pair of die sections, a plunger co-acting with said die sections, an actuating member for moving the plunger, a block for each of said die sections, said blocks being movable in a direction toward and from the die sections, means for connecting the die sections with the respective blocks, a toggle structure for actuating each of said blocks, and means for connecting said toggles with said actuating member.

46. In a counter forming machine, a pair of die sections, a forming plunger co-acting with said die sections, an actuating member for actuating said plunger, a sliding block for each of said die sections, each of said blocks having a chamfered upper portion, means for pivotally connecting the respective die sections with the respective blocks adjacent said chamfered portions whereby when the blocks are opened they may move pivotally against said chamfered portions, a spring member carried by each of the blocks for causing said die sections to move pivotally in a certain direction as the blocks are moved toward an open position, and means for connecting the blocks with said actuating member, said means causing the blocks to be slid back and forth in proper timed relationship with the movement of the forming plunger.

47. In a counter forming machine, a pair of die sections, a forming plunger co-acting with the die sections, an actuating member for actuating said plunger, a pair of sliding blocks, means for pivoting one of the die sections to each of said blocks, a toggle structure for moving each of said blocks, a reciprocating member arranged adjacent said toggle structure and in said actuating member, a substantial link structure for connecting each of said toggles with one of said reciprocating members, and resilient means for connecting said reciprocating members with said actuating member.

48. In a counter forming machine, a pair of die sections, a forming plunger co-acting therewith, an actuating member for actuating said plunger, and means for opening and closing said die sections, said means being operated by said actuating member and including toggles and springs resisting straightening of the toggles but arranged to yield for compensating excessive strain on said die sections.

49. In a forming machine, a pair of die sections, a forming plunger co-acting therewith, an actuating bar for moving said plunger, means for actuaing said die sections, said means including a system of toggles, reciprocating members carried by said bar and positioned to actuate the toggles, a pivotally mounted lever for limiting the reciprocation of each of said reciprocating members, and a spring for determining the amount of movement of each lever.

50. In a counter forming machine, a pair of die sections, a forming plunger co-acting with said sections, an actuating bar for actuating said plunger, a reciprocating member arranged in each end of said bar, means for connecting said reciprocating members with the die sections for moving the die sections in timed relation with the plunger, a lever pivotally mounted adjacent each end of said bar and resting on one of the reciprocating members extending therethrough, and a spring acting on one end of each of said levers for resiliently holding the same in a given position.

51. In a counter forming machine, a mold for pressing a blank into the form of a counter and wiping means for bending over the edge of the counter for producing a flange, said wiping mechanism including a wiping block, a link for actuating said block, a lever for actuating said link, a mutilated pinion for actuating said lever, and a mutilated gear provided with a plurality of spaced sets of teeth for causing said mutilated pinion to be operated a plurality of times and the wiping block moved a plurality of times over said mold for wiping the flange a plurality of times.

52. In a counter forming machine, a molding mechanism and a wiping mechanism for turning over a blank while positioned in the molding mechanism, said wiping mechanism including a wiping block, and means for actuating said block, said means including a gear formed with a plurality of sets of teeth and smooth portions arranged between the teeth, and a pinion co-acting with said gear provided with the same number of teeth as each of said tooth sections and with a smooth section struck on the arc of the smooth sections of said gear, said pinion being positioned so that the smooth sections thereof will engage and slide over the smooth sections of the gear as the gear rotates and the tooth sections of the gear will engage the tooth portion of the pinion for giving the pinion one rotation for each of the tooth sections of the gear whereby said wiping block will be moved across the mold the same number of times as there are tooth sections in said gear.

53. In a counter forming machine, a molding mechanism and a wiping mechanism, said wiping mechanism including a wiper block having a notch therein, means for actuating said wiper block, a wiper plate arranged in said notch, and a plurality of adjustable means carried by said wiper block for independently adjusting the upper and lower edges of the wiper plate, together with means bodily to adjust the plate toward and from the molding mechanism.

54. In a counter forming machine, a molding mechanism, a doffing member for doffing the finished counter, an abutment normally positioned beneath the molding mechanism, and means for withdrawing said abutment as said doffing mechanism begins to operate, said means including a link, a pivotally mounted lever for actuating said link, and a cam for actuating said lever.

55. In a counter forming machine, a molding mechanism, a doffing mechanism for doffing the finished counter, an abutment arranged adjacent the molding mechanism, and means for withdrawing the abutment as the doffing mechanism operates, said means including a link formed in two sections, means for limiting the independent movement of said sections in one direction, a spring for limiting the independent movement of said sections in the opposite direction within a limited distance, a lever for actuating said link, and means for actuating said lever.

56. In a counter forming machine, a molding mechanism, an abutment therefor, a doffing mechanism, and means for moving the abutment to an inoperative position as the doffing mechanism begins to operate, said means including a link pivotally connected with the abutment, a pivotally mounted arm pivotally connected with the link, an actuating cam, and means extending from the arm engaged by the cam for moving said arm back and forth.

57. In a counter forming machine, a forming mold, an abutment therefor, a chute arranged beneath said abutment, wiping mechanism for wiping the counter while in said mold, a doffing mechanism for removing the counter from the mold, and means for moving the abutment away from said mold as the doffing mechanism operates, and means for guiding the removed counter to said chute.

58. A mold comprising, in combination, horizontally separable die sections opening upwardly, a former movable downwardly into the die formed by said sections to compress the work, and a member movable under said sections when they are closed to support them, and away from said sections when they are open to provide an unobstructed space for discharge of the compressed work.

59. A mold comprising, in combination, horizontally separable die sections opening upwardly, a former movable downwardly into the die formed by said sections to compress the work, a member movable under said sections when they are closed to support them, and away from said sections when they open to provide an unobstructed space for discharge of the compressed work, and a work guiding chute arranged beneath said member in its supporting position to receive the discharged work when the die sections open.

60. In a counter forming machine, a molding mechanism, a wiping mechanism for turning over the edge of said counter when in said mold, said mold being formed with an end section formed with corrugations extending in the direction of movement of the wiping mechanism for preventing the wiping mechanism from shearing the edge of said counter, and means for doffing the finished counter immediately after the wiping mechanism has ceased to function.

61. In a counter forming machine, a forming mechanism including a pluality of die sections, a forming plunger, an actuating member for actuating the forming plunger, means actuated by said actuating member for opening and closing the die sections, and adjustable members for varying the pressure of said means.

62. In a counter forming machine, a forming mechanism including a plurality of die sections, a forming plunger, an actuating member for actuating the forming plunger, a system of toggles for the die section for actuating the same, a sliding block associated with each of the toggles, and means for adjusting the position of said blocks for varying the action of said toggles and consequently the pressure on said die sections.

63. In a counter forming machine, a forming mechanism including a plurality of die sections, a forming plunger, an actuating member for actuating the forming plunger, a toggle mechanism for each of the die sections, said toggle mechanisms being operated by the means for actuating the plunger, a sliding block for each of said toggle mechanisms, a threaded member connected with each of said blocks, a nut for locking each of said blocks in a given position, and a spacing shim arranged in back of each of said block.

64. In a counter forming machine, an automatic feed, comprising means for guiding flat blanks to a given point, a feed plate for removing said blanks a predetermined distance, a pivotally mounted arm connected with said plate, a weight carried by said arm for urging the arm in one direction a member projecting from said arm intermediate its length, and a rotating cam formed to act on said member for moving the arm against the action of said weight whereby as the said cam rotates said arm and plate will have a back and forth movement, in combination with blank treating members normally positioned on opposite sides of the path of the plate to receive a blank fed thereby.

65. In a counter forming machine, a molding mechanism including a pair of dies, a slide carrying each die, a molding plunger, toggles connected to the slides for simultaneously moving said dies to a closed position, means for moving the plunger to a closed position, said means moving and operating in synchrony with said slides, said last mentioned means including a toggle, a link connected with said toggle and adapted to move the toggle to an open and to a closed position, a pair of rollers carried by said link, a cam provided with a cam face, and a cam groove, one of said rollers being operatively positioned in said groove and the other positioned to engage said cam face, and means for guiding said link as said cam rotates whereby the link will be given a substantially reciprocatory motion for opening and closing said toggle.

66. A machine of the character described, comprising a magazine adapted to receive flat blanks, feeding means to force blanks successively from said magazine, a co-operating mold and plunger to bend the blanks into U-shaped form, a reciprocating slide, a rotary spider or turret mounted on said slide, substantially U-shaped jaws carried by said turret and adapted to grip said blanks after they have been bent into U-shaped form, said turret being adapted to turn the gripped blanks to 180° and present them for removal, a mold for receiving said blanks after they have been turned, a co-operating plunger acting with said last mentioned mold to press the blank into form, said last mentioned mold and plunger acting to seize the blanks presented by the turret and compress the blanks into a final form, and an ejector for removing the finished counters.

67. In a counter forming machine, a molding mechanism comprising a pair of die sections, a molding plunger, one set of mechanism including relatively sliding plungers for moving said die sections to a closed position, a second set of mechanism for moving the plunger to a closed position, said second set of mechanism comprising a toggle, a link connected with said toggle for actuating the same, a swinging arm for holding said link in operative position, a roller carried by said link, and a cam acting on said roller for moving the link and toggle to a closed position.

SIDNEY JOHNATHAN HEATH.